United States Patent
Sugiyama et al.

(10) Patent No.: US 12,325,286 B2
(45) Date of Patent: Jun. 10, 2025

(54) ATTACHMENT STRUCTURE FOR EXPANSION VALVES

(71) Applicant: DENSO CORPORATION, Kariya (JP)

(72) Inventors: Yuki Sugiyama, Kariya (JP); Masakazu Morimoto, Kariya (JP); Yasuhiro Mizuno, Kariya (JP); Masaki Uchiyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 303 days.

(21) Appl. No.: 17/954,620

(22) Filed: Sep. 28, 2022

(65) Prior Publication Data

US 2023/0016310 A1 Jan. 19, 2023

Related U.S. Application Data

(63) Continuation of application No. PCT/JP2021/008123, filed on Mar. 3, 2021.

(30) Foreign Application Priority Data

Apr. 3, 2020 (JP) ................................. 2020-067388

(51) Int. Cl.
*B60H 1/32* (2006.01)
*B60H 1/00* (2006.01)

(52) U.S. Cl.
CPC ....... *B60H 1/3229* (2013.01); *B60H 1/00485* (2013.01)

(58) Field of Classification Search
CPC ... B60H 1/3229; B60H 1/00485; G05D 23/02
See application file for complete search history.

(56) References Cited

U.S. PATENT DOCUMENTS

| 2003/0193187 | A1 | 10/2003 | Takada et al. |
| 2010/0180613 | A1* | 7/2010 | Takasaki ............... F25B 41/335 62/225 |
| 2012/0199661 | A1* | 8/2012 | Hara .................. B60H 1/00528 236/92 B |
| 2015/0027161 | A1 | 1/2015 | Ohtani et al. |
| 2016/0010898 | A1* | 1/2016 | Takeuchi .................. F25B 7/00 62/498 |
| 2018/0156349 | A1* | 6/2018 | Iwa ...................... F04B 27/1804 |
| 2019/0160908 | A1* | 5/2019 | Kim ........................ F28D 9/005 |
| 2020/0158381 | A1 | 5/2020 | Kato |

(Continued)

FOREIGN PATENT DOCUMENTS

| CN | 207994013 U | 10/2018 |
| JP | H11173604 A | 7/1999 |
| JP | 2003301986 A | 10/2003 |

(Continued)

OTHER PUBLICATIONS

JP 2015068633 A.*

*Primary Examiner* — Elizabeth J Martin
(74) *Attorney, Agent, or Firm* — Harness, Dickey & Pierce, P.L.C.

(57) ABSTRACT

An attachment structure includes expansion valves used in a vehicle, and a housing to which the expansion valves are attached. The housing includes a flow path through which heat medium circulating in a heat pump cycle of an air conditioner of the vehicle flows, and the flow path is opened and closed by the expansion valves.

12 Claims, 14 Drawing Sheets

(56) References Cited

U.S. PATENT DOCUMENTS

2020/0386483 A1* 12/2020 Choi .................... F28F 9/0246

FOREIGN PATENT DOCUMENTS

| | | | |
|---|---|---|---|
| JP | 2013139941 A | | 7/2013 |
| JP | 2014163578 A | | 9/2014 |
| JP | 2015068633 A | * | 4/2015 |
| JP | 2019027691 A | | 2/2019 |
| JP | 2020015382 A | | 1/2020 |

* cited by examiner

ATTACHMENT STRUCTURE FOR EXPANSION VALVES

CROSS REFERENCE TO RELATED APPLICATIONS

The present application is a continuation application of International Patent Application No. PCT/JP2021/008123 filed on Mar. 3, 2021, which designated the U.S. and claims the benefit of priority from Japanese Patent Application No. 2020-067388 filed on Apr. 3, 2020. The entire disclosure of all of the above applications are incorporated herein by reference.

TECHNICAL FIELD

The present disclosure relates to an attachment structure for expansion valves.

BACKGROUND

An air conditioner for a vehicle includes a heat pump cycle that functions as a heat cycle that performs cooling operation and heating operation. The heat pump cycle includes an electric compressor, a water-refrigerant heat exchanger, an outdoor heat exchanger, an evaporator, a first expansion valve, and a second expansion valve.

SUMMARY

According to at least one embodiment of the present disclosure, an attachment structure includes expansion valves used in a vehicle, and a housing to which the expansion valves are attached. The housing includes a flow path through which heat medium circulating in a heat pump cycle of an air conditioner of the vehicle flows, and the flow path is opened and closed by the expansion valves.

BRIEF DESCRIPTION OF DRAWINGS

The details of one or more embodiments are set forth in the accompanying drawings and the description below. Other features and advantages will be apparent from the description and drawings, and from the claims.

DETAILED DESCRIPTION

Figure 1:
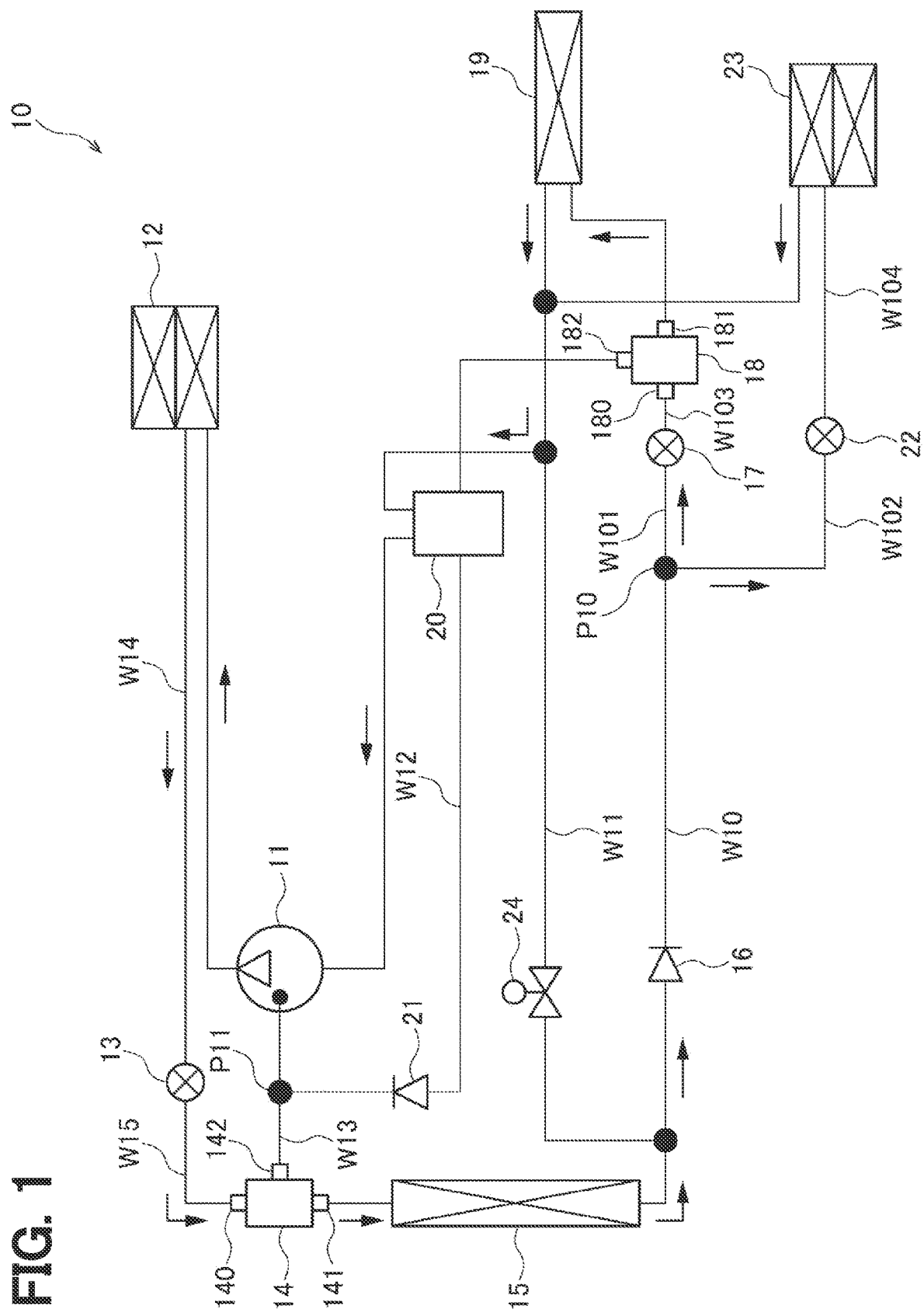
FIG. 1 is a block diagram illustrating a schematic configuration of a heat pump system according to a first embodiment.

To begin with, examples of relevant techniques will be described. An air conditioner for a vehicle, according to a comparative example, includes a heat pump cycle that functions as a heat cycle that performs cooling operation and heating operation. The heat pump cycle includes an electric compressor, a water-refrigerant heat exchanger, an outdoor heat exchanger, an evaporator, a first expansion valve, and a second expansion valve.

When the air conditioner performs the cooling operation, the heat pump cycle circulates a refrigerant in the order of the electric compressor, the outdoor heat exchanger operating as a condenser, the first expansion valve, and the evaporator. In the cooling operation, the evaporator performs heat exchange between the refrigerant flowing inside the evaporator and air flowing through an air conditioning duct, thereby cooling the air. The cooled air is blown into a vehicle compartment through the air conditioning duct, and thereby the vehicle compartment is cooled.

On the other hand, when the air conditioner performs the heating operation, the heat pump cycle circulates the refrigerant in the order of the electric compressor, the water-refrigerant heat exchanger, the second expansion valve, and the outdoor heat exchanger operating as an evaporator. In the heating operation, the water-refrigerant heat exchanger heats cooling water via heat exchange between the refrigerant flowing in the water-refrigerant heat exchanger and the cooling water flowing in a heater core. In the heater core, heat is exchanged between the cooling water flowing inside the heater core and the air flowing through the air conditioning duct, thereby heating the air. The heated air is blown into the vehicle compartment through the air conditioning duct, and thereby the vehicle compartment is heated.

The air conditioner is normally arranged in an engine room of a vehicle. Therefore, when multiple expansion valves are required as in the air conditioner of the comparative example, the expansion valves are scattered at different locations in the engine room. Therefore, it may be necessary to secure, in the engine room, spaces for installing the expansion valves, spaces for installing pipes connecting the expansion valves and other components, and the like. This may deteriorate ease of attachment of the expansion valves.

In contrast, according to the present disclosure, an attachment structure capable of saving space for attachment of multiple expansion valves can be provided.

According to at least one embodiment of the present disclosure, an attachment structure includes expansion valves used in a vehicle, and a housing to which the expansion valves are attached. The housing includes a flow path through which heat medium circulating in a heat pump cycle of an air conditioner of the vehicle flows, and the flow path is opened and closed by the expansion valves.

According to this configuration, since the expansion valves can be collectively arranged in the housing, an installation space for the expansion valves can be reduced as compared with a case where the expansion valves are scattered. Further, since the flow path that is opened and closed by the expansion valves is also arranged inside the housing, flow paths connecting the expansion valves and other components of the heat pump cycle can be shortened. Therefore, the space for attachment of the expansion valves can be saved.

Hereinafter, an embodiment of an attachment structure for expansion valves will be described with reference to the drawings. To facilitate understanding, identical constituent elements are assigned the same numeral in the drawings, and the duplicate descriptions on those will be omitted.

First Embodiment

First, a schematic configuration of a heat pump cycle including an attachment structure for expansion valves will be described.

The heat pump cycle 10 shown in FIG. 1 is one of components of an air conditioner for a vehicle. The heat pump cycle 10 is a thermal system that cools or heats air by performing heat exchange between a heat medium circulating in the cycle and the air flowing in an air conditioning duct. The air conditioner cools or heats air inside a vehicle compartment by blowing the air cooled or heated by the heat pump cycle 10 into the vehicle compartment through the air conditioning duct. The heat pump cycle 10 also cools a battery mounted on the vehicle when the air conditioner performs a cooling operation. The battery to be cooled by the heat pump cycle 10 is, for example, a battery used for supplying electric power to a motor for running of an electric vehicle or a hybrid vehicle.

The heat pump cycle 10 operates in a first circulation circuit as indicated by the arrows in FIG. 1 when the air conditioner is in the cooling operation. That is, the heat pump cycle 10 forms a heat medium circuit in which a heat medium flows through a compressor 11, a water-medium heat exchanger 12, a heating expansion valve 13, a heating gas-liquid separator 14, an outdoor heat exchanger 15, a check valve 16, a cooling expansion valve 17, a cooling gas-liquid separator 18, an evaporator 19, and an accumulator 20 in this order, and then the heat medium is sucked into the compressor 11 again.

The compressor 11 sucks and compresses the heat medium in gas phase stored in the accumulator 20, and discharges the high-temperature and high-pressure gas-phase compressed heat medium. When the heat pump cycle 10 forms the first circulation circuit shown in FIG. 1, the water-medium heat exchanger 12 and the heating expansion valve 13 do not act on the heat medium. Therefore, the high-temperature and high-pressure gas-phase heat medium discharged from the compressor 11 flows into the heating gas-liquid separator 14 as it is.

The heating gas-liquid separator 14 has an inflow port 140, a first outflow port 141 and a second outflow port 142. The heating expansion valve 13 is connected to the inflow port 140. The outdoor heat exchanger 15 is connected to the first outflow port 141. The compressor 11 is connected to the second outflow port 142 via a flow path W13. When the heat pump cycle 10 operates in the first circulation circuit shown in FIG. 1, the inflow port 140 and the first outflow port 141 of the heating gas-liquid separator 14 are open, and the second outflow port 142 is closed. In this case, when the high-temperature and high-pressure gas-phase heat medium discharged from the compressor 11 flows into the first outflow port 141, the heating gas-liquid separator 14 allows the gas-phase heat medium to flow toward the outdoor heat exchanger 15 through the first outflow port 141 as it is.

The outdoor heat exchanger 15 performs heat exchange between air and the high-temperature and high-pressure gas-phase heat medium that has passed through the heating gas-liquid separator 14. The heat exchange in the outdoor heat exchanger 15 causes heat of the heat medium to be absorbed by the air, and accordingly the heat medium is cooled. As a result, the high-temperature and high-pressure gas-phase heat medium condenses to become high-pressure liquid-phase heat medium. Thus, the outdoor heat exchanger 15 functions as a condenser.

The heat medium discharged from the outdoor heat exchanger 15 flows through the check valve 16 to a flow path W10 or a flow path W11. The flow path W10 is connected to the cooling expansion valve 17 and a battery cooling expansion valve 22. The flow path W11 is connected to the accumulator 20. The flow path W10 is branched at a bifurcation P10 into a flow path W101 provided with the cooling expansion valve 17 and a flow path W102 provided with the battery cooling expansion valve 22. An electromagnetic valve 24 is arranged in the flow path W11. When the heat pump cycle 10 operates in the first circulation circuit shown in FIG. 1, the electromagnetic valve 24 is closed. Therefore, the heat medium discharged from the outdoor heat exchanger 15 flows into the cooling expansion valve 17 and the battery cooling expansion valve 22 through the check valve 16.

The cooling expansion valve 17 reduces the pressure of the high-pressure liquid-phase heat medium discharged from the outdoor heat exchanger 15 and discharges low-pressure liquid-phase heat medium. The low-pressure liquid-phase heat medium discharged from the cooling expansion valve 17 flows into the cooling gas-liquid separator 18 via a flow path W103.

The cooling gas-liquid separator 18 has an inflow port 180, a first outflow port 181 and a second outflow port 182. The cooling expansion valve 17 is connected to the inflow port 180. The evaporator 19 is connected to the first outflow port 181. The compressor 11 is connected to the second outflow port 182 via flow paths W12 and W13. The flow path W13 connects the second outflow port 142 of the heating gas-liquid separator 14 and the compressor 11. The flow path W12 is connected to a junction P11 located at an intermediate part of the flow path W13. A check valve 21 is provided in the flow path W12. When the heat pump cycle 10 operates in the first circulation circuit shown in FIG. 1, the inflow port 180, the first outflow port 181, and the second outflow port 182 of the cooling gas-liquid separator 18 are all open. The heat medium flowing from the cooling expansion valve 17 into the inflow port 180 of the cooling gas-liquid separator 18 is two-phase heat medium containing not only liquid-phase heat medium but also gas-phase heat medium. The cooling gas-liquid separator 18 separates the two-phase heat medium into the liquid-phase heat medium and the gas-phase heat medium. The liquid-phase heat medium separated by the cooling gas-liquid separator 18 flows into the evaporator 19 through the first outflow port 181. The gas-phase heat medium separated by the cooling gas-liquid separator 18 is discharged from the second outflow port 182 and then sucked into the compressor 11 through the check valve 21.

The evaporator 19 performs heat exchange between the low-pressure liquid-phase heat medium discharged from the cooling gas-liquid separator 18 and air flowing through the air conditioning duct. Accordingly, heat of the air is absorbed into the heat medium, and thereby the air is cooled. As a result, the low-pressure liquid-phase heat medium evaporates to be low-pressure gas-phase heat medium. The air conditioner blows the air cooled by the evaporator 19 into the vehicle compartment, and thereby the vehicle compartment is cooled. The low-pressure gas-phase heat medium discharged from the evaporator 19 flows into the accumulator 20.

The heat medium flowing from the evaporator 19 to the accumulator 20 is two-phase heat medium containing not only gas-phase heat medium but also liquid-phase heat medium. The accumulator 20 separates the two-phase heat medium into the liquid-phase heat medium and the gas-phase heat medium, and temporarily stores the surplus liquid-phase heat medium. Only the gas-phase heat medium separated by the accumulator 20 is sucked into the compressor 11.

When the heat pump cycle 10 forms the first circulation circuit shown in FIG. 1, a part of the high-pressure liquid-phase heat medium discharged from the outdoor heat exchanger 15 flows into the battery cooling expansion valve 22 via the flow path W102. The battery cooling expansion valve 22 reduces the pressure of the high-pressure liquid-phase heat medium discharged from the outdoor heat exchanger 15 and discharges low-pressure liquid-phase heat medium. The low-pressure liquid phase heat medium discharged from the battery cooling expansion valve 22 flows into a cooling water circulator 23 via a flow path W104.

The cooling water circulator 23 performs heat exchange between the low-pressure liquid-phase heat medium discharged from the battery cooling expansion valve 22 and cooling water circulating through a battery of the vehicle. Accordingly, heat of the cooling water is absorbed by the heat medium, and thus the cooling water is cooled. Then, the cooled cooling water circulates through the battery, and the battery is cooled. Gas-phase heat medium evaporated by absorbing the heat of the cooling water flows from the cooling water circulator 23 to the accumulator 20. The heat medium flowing from the cooling water circulator 23 to the accumulator 20 is two-phase heat medium containing not only gas-phase heat medium but also liquid-phase heat medium. The two-phase heat medium is separated into the gas-phase heat medium and the liquid-phase heat medium by the accumulator 20, and then only the gas-phase heat medium is sucked into the compressor 11.

In this manner, the heat pump cycle 10 operates in the first circulation circuit shown in FIG. 1, thereby being capable of cooling the vehicle compartment and cooling the battery.

Figure 2:
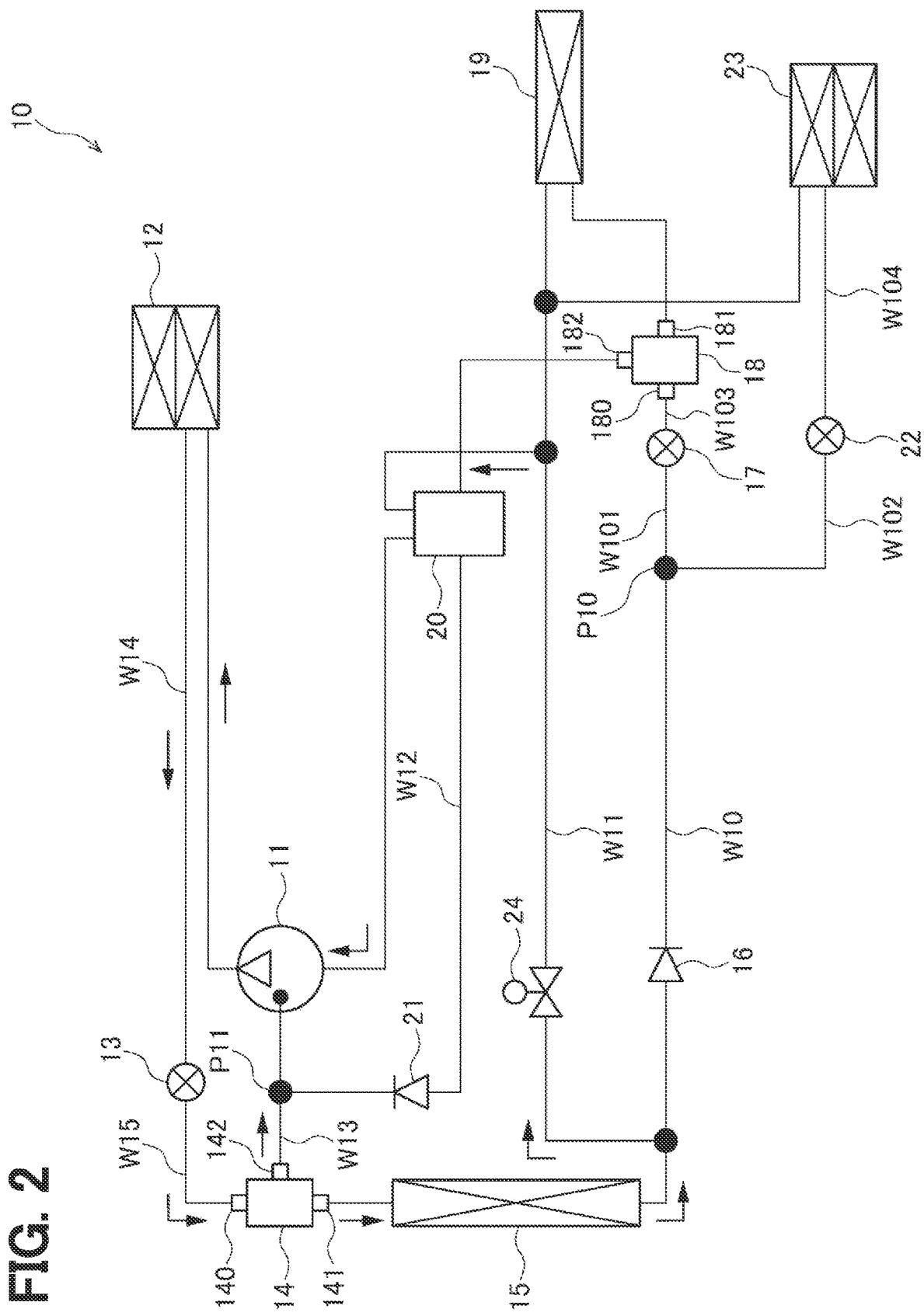
FIG. 2 is a block diagram illustrating an operation example of the heat pump system according to the first embodiment.

On the other hand, the heat pump cycle 10 operates in a second circulation circuit as indicated by the arrows in FIG. 2 when the air conditioner is in a heating operation. That is, the heat pump cycle 10 forms a heat medium circuit in which a heat medium flows through a compressor 11, a water-medium heat exchanger 12, a heating expansion valve 13, a heating gas-liquid separator 14, an outdoor heat exchanger 15, and an accumulator 20 in this order, and then the heat medium is sucked into the compressor 11 again.

The compressor 11 sucks and compresses the heat medium in gas phase stored in the accumulator 20, and discharges the high-temperature and high-pressure gas-phase compressed heat medium. The high-temperature and high-pressure gas-phase heat medium discharged from the compressor 11 flows into the water-medium heat exchanger 12.

The water-medium heat exchanger 12 performs heat exchange between the high-temperature and high-pressure gas-phase heat medium discharged from the compressor 11 and cooling water circulating through the heater core of the air conditioner. Accordingly, heat of the heat medium is absorbed into the cooling water, and thus the cooling water is heated. The heater core heats the air-conditioning air via heat exchange between the cooling water heated by the water-medium heat exchanger 12 and the air-conditioning air flowing through the air conditioning duct. This heated air is blown into the vehicle compartment, and thereby the vehicle compartment is heated. In the water-medium heat exchanger 12, the high-temperature and high-pressure gas-phase heat medium is cooled by exchanging heat with the cooling water and condenses to become high-pressure liquid-phase heat medium. The high-pressure liquid-phase heat medium discharged from the water-medium heat exchanger 12 flows into the heating expansion valve 13 via a flow path W14.

The heating expansion valve 13 reduces a pressure of the high-pressure liquid-phase heat medium discharged from the water-medium heat exchanger 12 and discharges low-pressure liquid-phase heat medium. The low-pressure liquid-phase heat medium discharged from the heating expansion valve 13 flows into the inflow port 140 of the heating gas-liquid separator 14 via a flow path W15.

When the heat pump cycle 10 operates in the second circulation circuit shown in FIG. 2, the inflow port 140, the first outflow port 141, and the second outflow port 142 of the heating gas-liquid separator 14 are all open. The heat medium flowing from the heating expansion valve 13 into the heating gas-liquid separator 14 is two-phase heat medium containing not only liquid-phase heat medium but also gas-phase heat medium. The heating gas-liquid separator 14 separates the two-phase heat medium into the liquid-phase heat medium and the gas-phase heat medium. The liquid-phase heat medium separated by the heating gas-liquid separator 14 flows into the outdoor heat exchanger 15 through the first outflow port 141. The gas-phase heat medium separated by the heating gas-liquid separator 14 is sucked into the compressor 11 through the second outflow port 142.

The outdoor heat exchanger 15 performs heat exchange between air and the low-pressure liquid-phase heat medium discharged from the heating gas-liquid separator 14. The heat exchange in the outdoor heat exchanger 15 causes heat of the air to be absorbed by the heat medium, and accordingly the heat medium is evaporated. Thus, the outdoor heat exchanger 15 functions as an evaporator. When the heat pump cycle 10 forms the second circulation circuit shown in FIG. 2, all the ports 180, 181, 182 of the cooling gas-liquid separator 18 are closed, and the electromagnetic valve 24 is open. Therefore, the low-pressure gas-phase heat medium discharged from the outdoor heat exchanger 15 flows into the accumulator 20 through the flow path W11.

The heat medium flowing from the outdoor heat exchanger 15 to the accumulator 20 is two-phase heat medium containing not only gas-phase heat medium but also liquid-phase heat medium. The accumulator 20 separates the two-phase heat medium into the liquid-phase heat medium and the gas-phase heat medium, and temporarily stores the surplus liquid-phase heat medium. Only the gas-phase heat medium separated by the accumulator 20 is sucked into the compressor 11.

In this manner, the heat pump cycle 10 operates in the second circulation circuit shown in FIG. 2, thereby being capable of heating the vehicle compartment.

As shown in FIGS. 1 and 2, the heat pump cycle 10 of the present embodiment requires the three expansion valves: the heating expansion valve 13; the cooling expansion valve 17; and the battery cooling expansion valve 22 for realization of the cooling and heating of the vehicle compartment by the air conditioner and the cooling of the battery. When these three expansion valves 13, 17, 22 are scattered in an engine room of the vehicle, it is necessary to secure installation spaces for them individually in the engine room. This may be a factor that deteriorates ease of attachment of the expansion valves 13, 17, 22.

Figure 3:
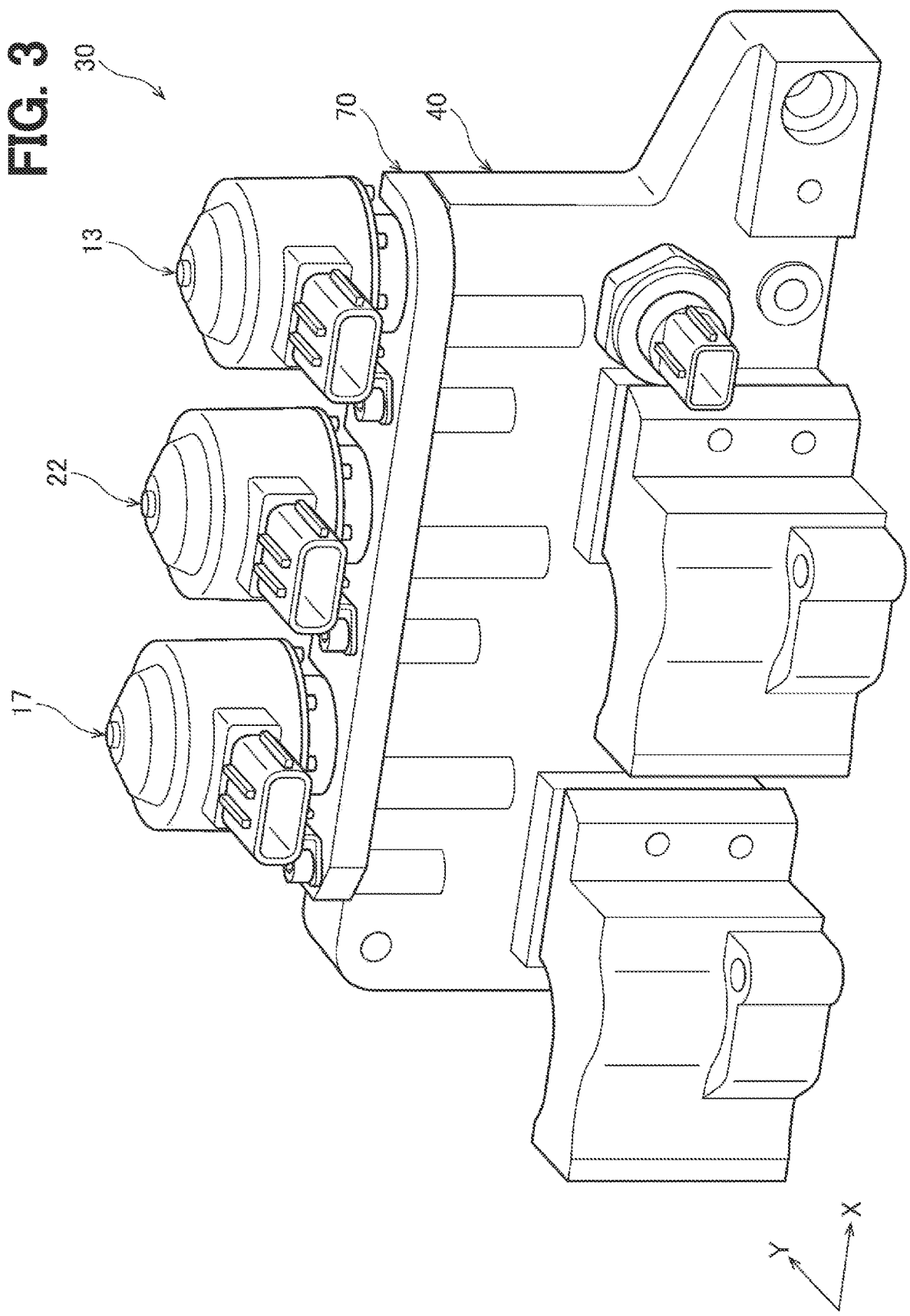
FIG. 3 is a perspective view showing an attachment structure for expansion valves according to the first embodiment.

Therefore, as shown in FIG. 3, in the attachment structure 30 for expansion valves, according to the present embodiment, the three expansion valves 13, 17, 22 are collectively attached to a housing 40. The three expansion valves 13, 17, 22 are close to and next to each other. As a result, the three expansion valves 13, 17, 22 can be collectively installed in one space within the engine room simply by fixing the housing 40 in the engine room, so that the ease of attachment of the three expansion valves 13, 17, 22 can be improved.

Next, the attachment structure 30 of the expansion valves 13, 17, 22 of the present embodiment will be described in detail.

Figure 4:
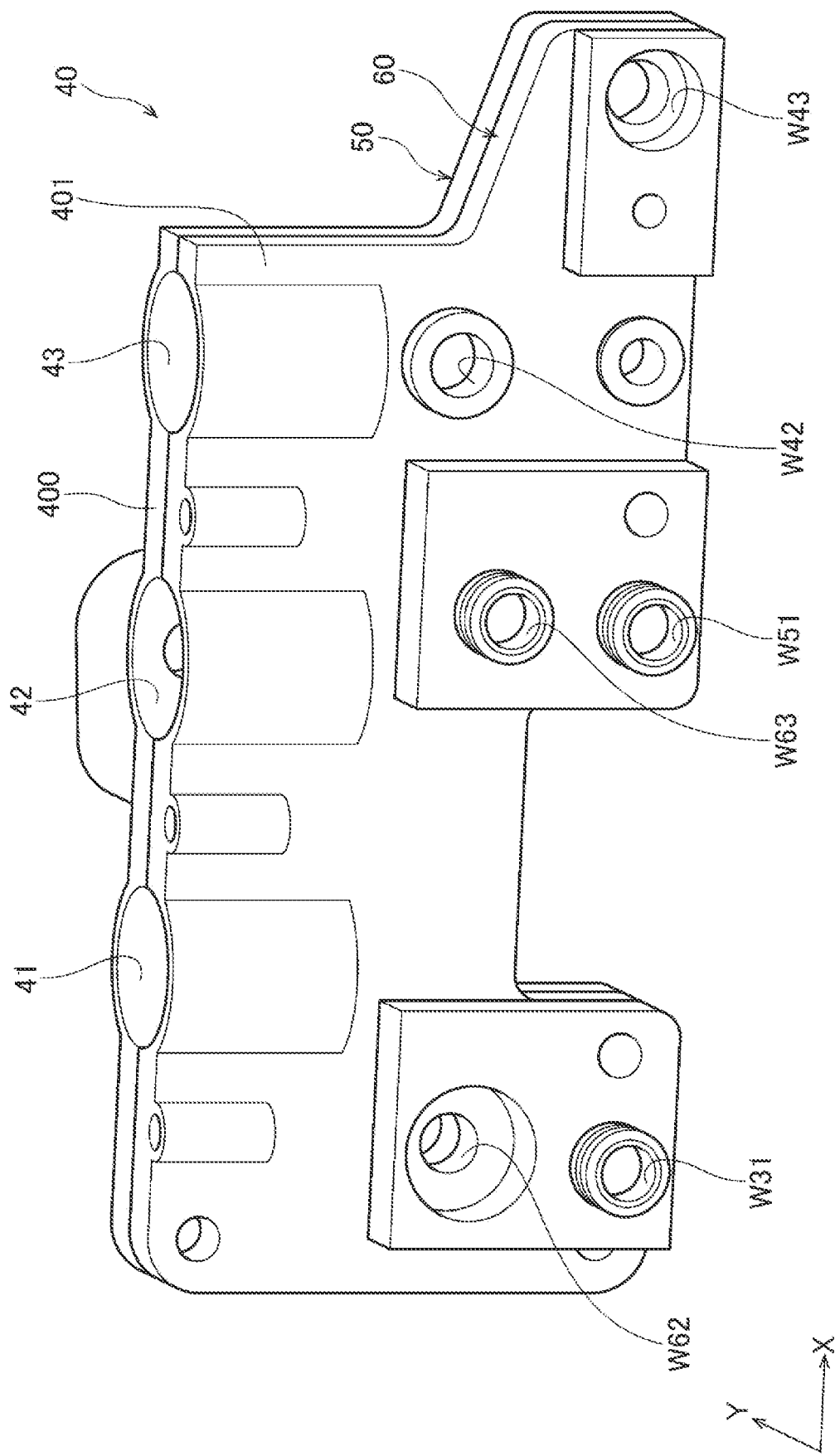
FIG. 4 is a perspective view showing a housing according to the first embodiment.
Figure 5:
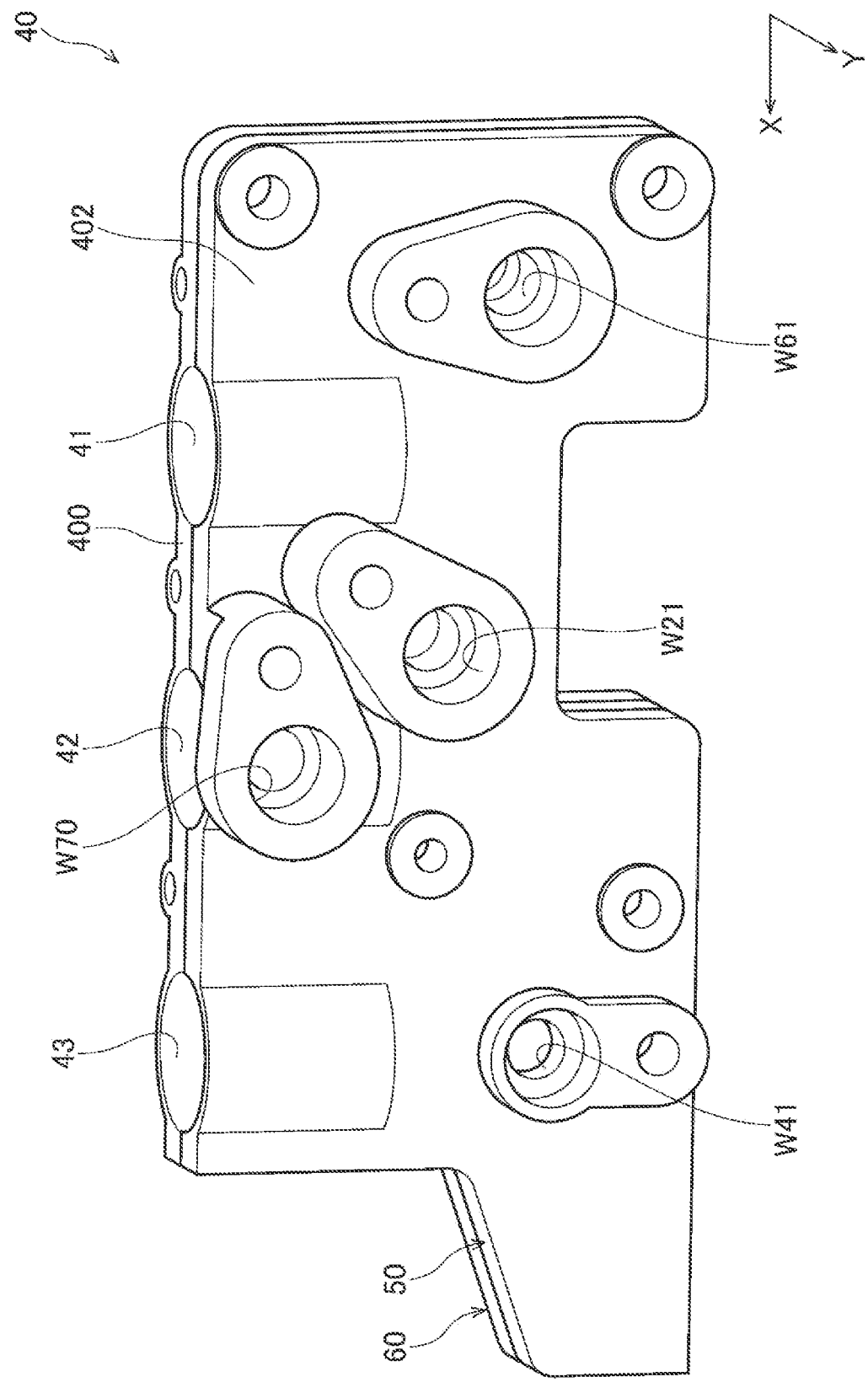
FIG. 5 is a perspective view showing the housing according to the first embodiment.
Figure 6:
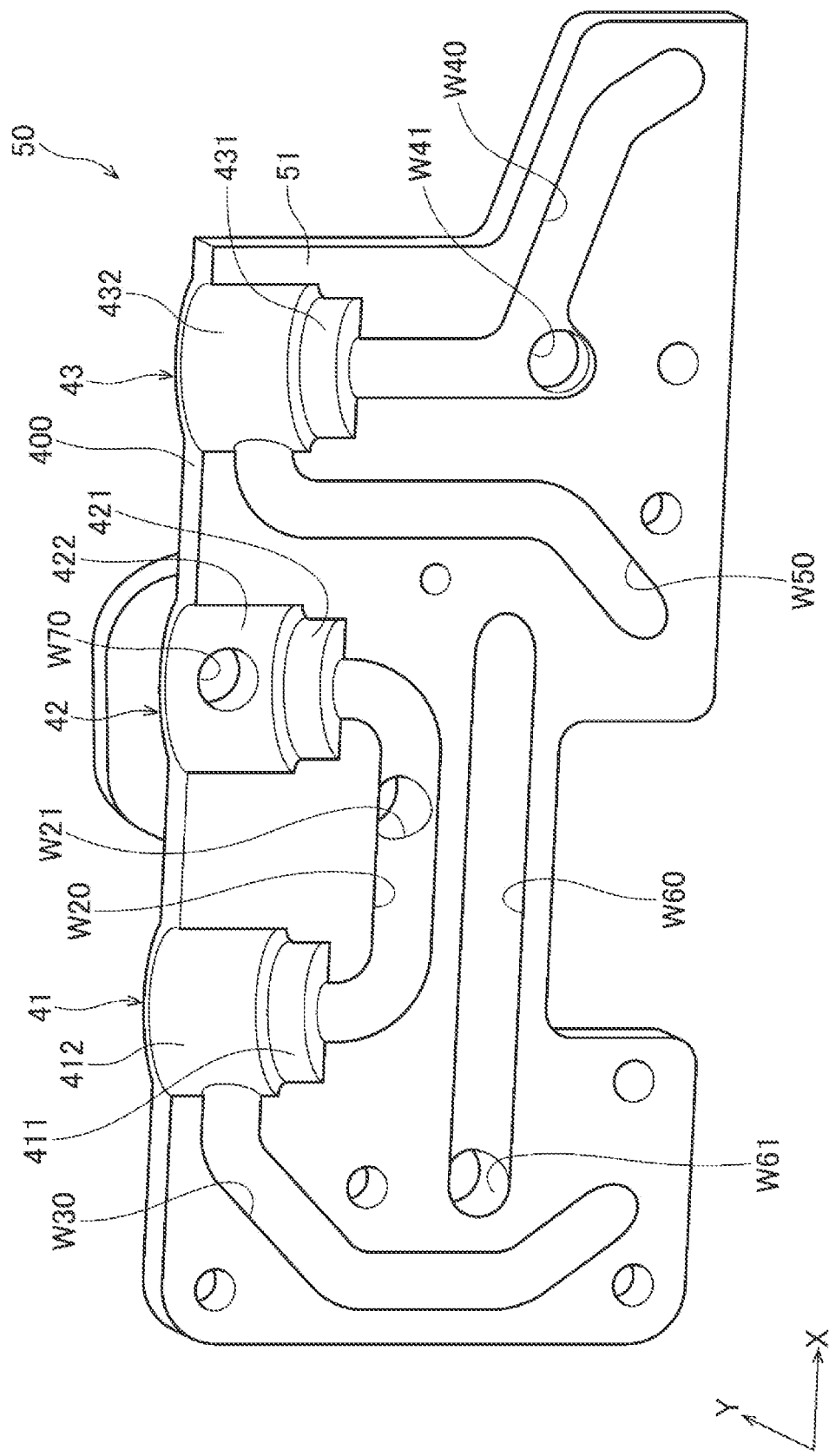
FIG. 6 is a perspective view showing a first plate member of the housing according to the first embodiment.
Figure 7:
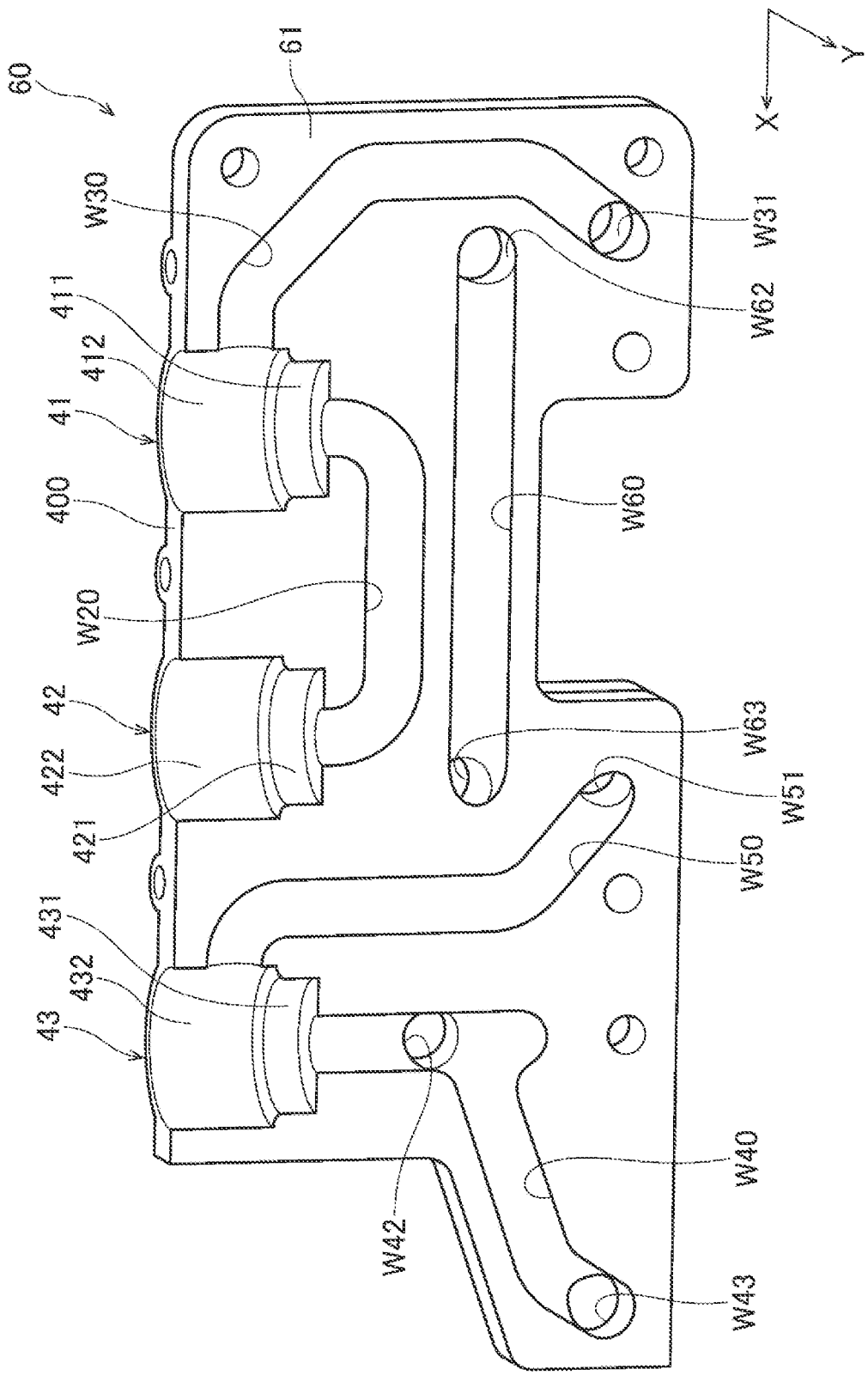
FIG. 7 is a perspective view showing a second plate member of the housing according to the first embodiment.

As shown in FIGS. 4 and 5, the housing 40 includes two plate members 50 and 60. The first plate member 50 has a structure as shown in FIG. 6. The second plate member 60 has a structure as shown in FIG. 7. The first and second plate members 50, 60 are mated to each other such that an outer surface 51 of the first plate member 50 shown in FIG. 6 is in contact with an outer surface 61 of the second plate member 60 shown in FIG. 7. Accordingly, the housing 40 is formed. As shown in FIGS. 6 and 7, each plate member 50, 60 has grooves for forming insertion holes 41, 42, 43 of the housing 40 and internal flow paths W20, W30, W40, W50, W60.

The insertion holes 41, 42, 43 are aligned on an upper surface 400 of the housing 40. Each insertion hole 41, 42, 43 is formed in a recessed shape so as to open upward on the upper surface 400 of the housing 40. Each insertion hole 41, 42, 43 has a circular shape in cross-section perpendicular to a central axis of the insertion hole. Diameters of lower portions 411, 421, 431 of the insertion holes 41, 42, 43 are smaller than diameters of upper portions 412, 422, 432 of the insertion holes 41, 42, 43, respectively.

The housing 40 has therein an internal flow path W20 through which a bottom surface of the first insertion hole 41 and a bottom surface of the second insertion hole 42 communicate with each other. As shown in FIG. 6, a middle portion of the internal flow path W20 has a branch flow path W21. The branch flow path W21 is branched from the middle portion of the internal flow path W20 and extends through a rear surface 402 of the housing 40 as shown in FIG. 5.

As shown in FIGS. 6 and 7, the housing 40 has therein an internal flow path W30 that extends from a lateral surface of the first insertion hole 41. As shown in FIG. 7, an end portion of the internal flow path W30 has a branch flow path W31. The branch flow path W31 extends from the end portion of the internal flow path W30 through a front surface 401 of the housing 40 as shown in FIG. 4.

As shown in FIGS. 6 and 7, the housing 40 has therein an internal flow path W40 that extends from a bottom surface of the third insertion hole 43. As shown in FIG. 6, a middle portion of the internal flow path W40 has a branch flow path W41. The branch flow path W41 is branched from the middle portion of the internal flow path W40 and extends through the rear surface 402 of the housing 40 as shown in FIG. 5. As shown in FIG. 7, another middle portion and an end portion of the internal flow path W40 has branch flow paths W42, W43, respectively. The branch flow paths W42, W43 are branched from the middle portion and the end portion of the internal flow path W40 and extends through the front surface 401 of the housing 40 as shown in FIG. 4, respectively. In addition, in the housing 40 of the present embodiment, the branch flow path W43 is closed.

As shown in FIGS. 6 and 7, the housing 40 has therein an internal flow path W50 that extends from a lateral surface of the third insertion hole 43. As shown in FIG. 7, an end portion of the internal flow path W50 has a branch flow path W51. The branch flow path W51 is branched from the end portion of the internal flow path W50 and extends through the front surface 401 of the housing 40 as shown in FIG. 4.

As shown in FIGS. 6 and 7, the housing 40 has therein an internal flow path W60 that is independent from the insertion holes 41, 42, 43. As shown in FIG. 6, one end portion of the internal flow path W60 has a branch flow path W61. The branch flow path W61 is branched from the one end portion of the internal flow path W60 and extends through the rear surface 402 of the housing 40 as shown in FIG. 5. As shown in FIG. 7, opposite end portions of the internal flow path W60 has branch flow paths W62, W63, respectively. The branch flow path W62 faces the branch flow path W61 as shown in FIG. 6. The branch flow paths W62, W63 are branched from the opposite end portions of the internal flow path W60 respectively, and extend through the front surface 401 of the housing 40 as shown in FIG. 4.

As shown in FIG. 6, a lateral surface of the second insertion hole 42 has a branch flow path W70. The branch flow path W70 extends from the second insertion hole 42 through the rear surface 402 of the housing 40 as shown in FIG. 5.

Figure 8:
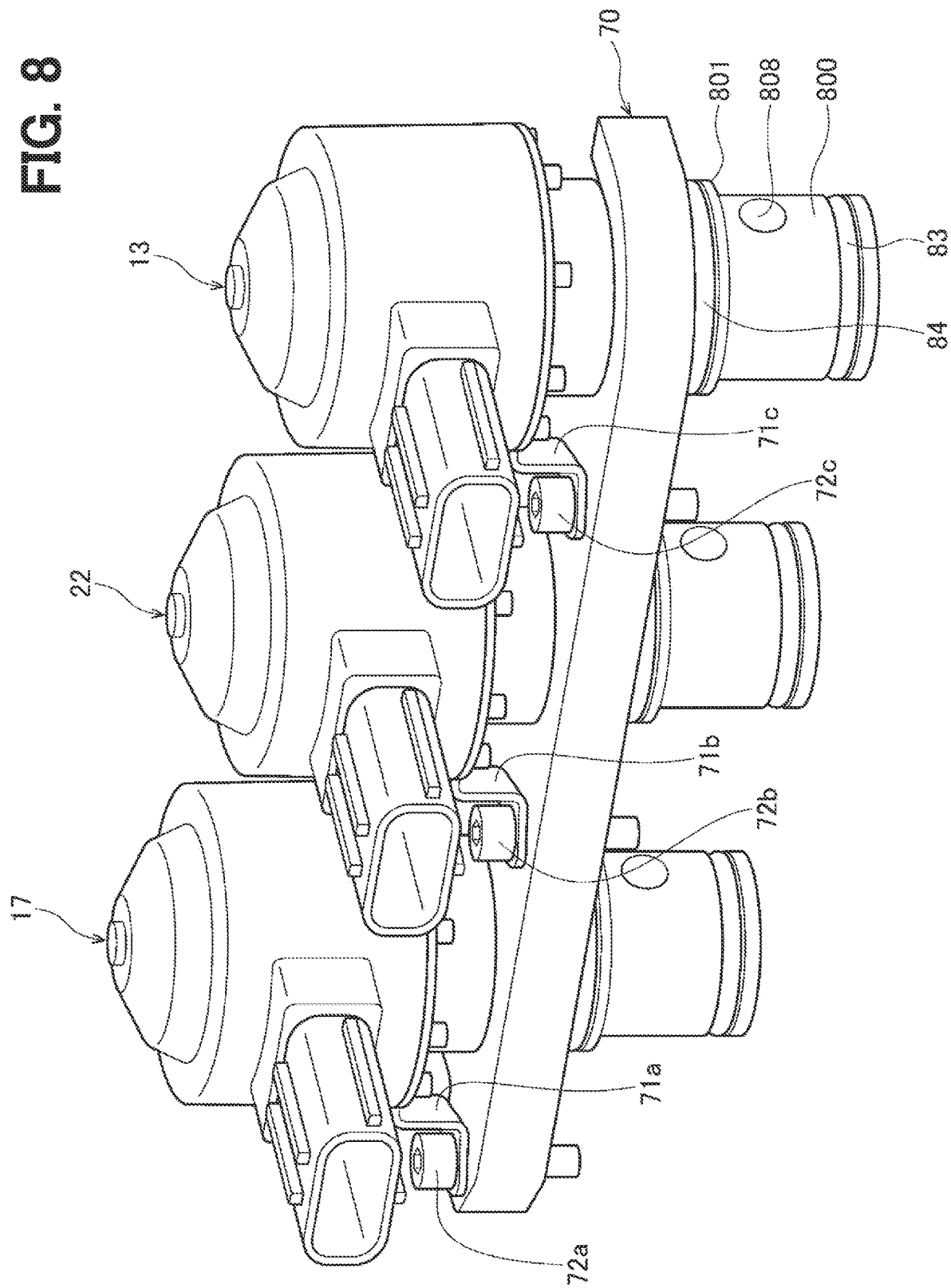
FIG. 8 is a perspective view showing the expansion valves and a retaining plate according to the first embodiment.

The expansion valves 13, 17, 22 shown in FIG. 8 are attached to the housing 40 shown in FIGS. 5 and 6 together with a retaining plate 70. The retaining plate 70 has a flat shape. The expansion valves 13, 17, 22 are aligned on the retaining plate 70. The expansion valves 13, 17, 22 are fixed to the retaining plate 70 with brackets 71a, 71b, 71c and bolts 72a, 72b, 72c. The expansion valves 13, 17, 22 are attached to the housing 40 by fixing the retaining plate 70 to the housing 40 as shown in FIG. 3. The cooling expansion valve 17 is inserted into the first insertion hole 41 of the housing 40 shown in FIG. 4. The battery cooling expansion valve 22 is inserted into the second insertion hole 42 of the housing 40. The heating expansion valve 13 is inserted into the third insertion hole 43 of the housing 40.

Figure 9:
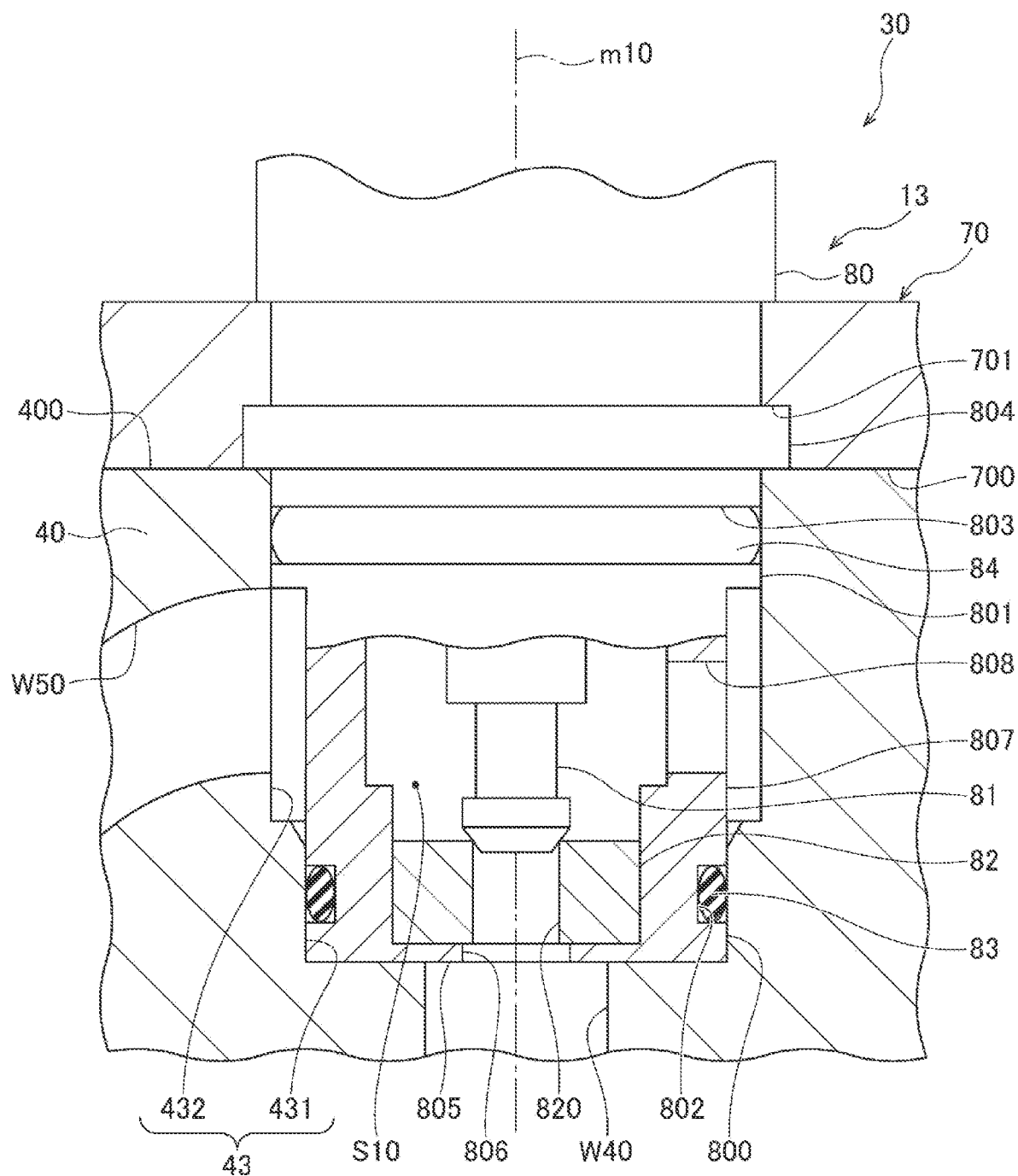
FIG. 9 is a cross-sectional diagram illustrating the housing around the expansion valves and the retaining plate, according to the first embodiment.

As shown in FIG. 9, the heating expansion valve 13 is inserted into the third insertion hole 43 of the housing 40. As shown in FIG. 9, the expansion valve 13 includes a body 80, a valve element 81, and a valve seat 82. The expansion valve 13 is an electric expansion valve that can be changed in degree of valve opening by movement of the valve element 81 caused by supply of electric power.

The body 80 has a bottomed cylindrical shape around an axis m10. The body 80 includes a small diameter portion 800 inserted into the lower portion 431 of the insertion hole 43, and a large diameter portion 801 inserted into the upper portion 432 of the insertion hole 43. An outer diameter of the large diameter portion 801 is larger than an outer diameter of the small diameter portion 800.

The small diameter portion 800 has an annular insertion groove 802 into which an O-ring 83 is inserted. The O-ring 83 seals a gap between an outer peripheral surface of the small diameter portion 800 of the body 80 and an inner peripheral surface of the lower portion 431 of the insertion hole 43.

Similarly, the large diameter portion 801 has an annular insertion groove 803 into which an O-ring 84 is inserted. The O-ring 84 seals a gap between an outer peripheral surface of the large diameter portion 801 of the body 80 and an inner peripheral surface of the upper portion 432 of the insertion hole 43.

In addition, in the present embodiment, the O-rings 83, 84 correspond to seals.

The large diameter portion 801 has a flange 804 located upward of the insertion groove 803. The flange 804 is inserted into a groove 701 formed on a bottom surface 700 of the retaining plate 70. The flange 804 is sandwiched between and held by the groove 701 of the retaining plate 70 and the upper surface 400 of the housing 40.

The body 80 has a bottom through-hole 806 that extends through a bottom wall 805 of the body 80 from an inner surface to an outer surface of the bottom wall 805. The body 80 has a lateral through-hole 808 that extends through a lateral wall 807 of the body 80 from an inner surface to an outer surface of the lateral wall 807. An internal space S10 of the body 80 communicates with the internal flow path W40 of the housing 40 through the bottom through-hole 806, and communicates with the internal flow path W50 of the housing 40 through the lateral through-hole 808.

The valve seat 82 is housed inside the body 80 so as to be in contact with the bottom wall 805. The valve seat 82 is made of a tubular member. The internal space S10 of the body 80 communicates with the bottom through-hole 806 of the body 80 through a communication hole 820 provided at a center of the valve seat 82.

The valve element 81 is housed in the internal space S10 of the body 80. As shown in FIG. 9, when the valve element 81 is seated on the valve seat 82, that is, when the expansion valve 13 is closed, a communication between the internal flow path W40 of the housing 40 and the internal flow path W50 of the housing 40 is blocked. When the valve element 81 is separated from the valve seat 82 by supply of electric power to the expansion valve 13, the internal flow path W40 of the housing 40 communicates with the internal flow path W50 of the housing 40 through the internal space S10 of the body 80. In this case, the expansion valve 13 reduces pressure of fluid flowing through the internal flow path W40, and allows the fluid to flow into the internal flow path W50.

An attachment structure for attachment of the cooling expansion valve 17 to the first insertion hole 41 and an attachment structure for attachment of the battery cooling expansion valve 22 to the second insertion hole 42 are the same as the attachment structure for attachment of the heating expansion valve 13 to the third insertion hole 43 shown in FIG. 9. Therefore, detailed descriptions about the attachment structures for attachment of the expansion valves 17, 22 will be omitted.

Next, a relationship between the attachment structure 30 for the expansion valves 13, 17, 22 shown in FIGS. 3 to 9 and the heat pump cycle 10 shown in FIGS. 1 and 2 will be described.

The branch flow path W21 of the housing 40 shown in FIG. 6 is connected to the flow path W10 shown in FIGS. 1 and 2. The branch flow path W70 formed in the second insertion hole 42 is connected to the flow path W104 shown in FIGS. 1 and 2. Therefore, a part of the internal flow path W20 of the housing 40 connecting from the branch flow path W21 to the second insertion hole 42 forms at least a part of the flow path W102 connecting from the bifurcation P10 of the flow path W10 to the battery cooling expansion valve 22 shown in FIGS. 1 and 2. Further, a part of the internal flow path W20 of the housing 40 connecting from the branch flow path W21 to the first insertion hole 41 forms at least a part of the flow path W101 connecting from the bifurcation P10 of the flow path W10 to the cooling expansion valve 17 shown in FIGS. 1 and 2. In addition, a junction of the internal flow path W20 and the branch flow path W21 in the housing 40 corresponds to the bifurcation P10 of the flow path W10 shown in FIGS. 1 and 2.

The branch flow path W31 of the housing 40 shown in FIG. 7 is connected to the inflow port 180 of the cooling gas-liquid separator 18 shown in FIGS. 1 and 2. Therefore, the internal flow path W30 of the housing 40 forms at least a part of the flow path W103 connecting from the cooling expansion valve 17 to the inflow port 180 of the cooling gas-liquid separator 18 shown in FIGS. 1 and 2.

The branch flow paths W41, W42 shown in FIGS. 6 and 7 are connected to the water-medium heat exchanger 12 shown in FIGS. 1 and 2. Therefore, a part of the internal flow path W40 of the housing 40 connecting from the branch flow paths W41, W42 to the third insertion hole 43 forms at least a part of the flow path W14 shown in FIGS. 1 and 2. Since the branch flow path W43 of the internal flow path W40 is closed, the heat medium flowing into the branch flow paths W41, W42 flows only toward the third insertion hole 43 through the internal flow path W40.

The branch flow path W51 shown in FIG. 7 is connected to the inflow port 140 of the heating gas-liquid separator 14 shown in FIGS. 1 and 2. Therefore, the internal flow path W50 of the housing 40 forms at least a part of the flow path W15 shown in FIGS. 1 and 2.

The branch flow path W61 shown in FIG. 6 is connected to the compressor 11 shown in FIGS. 1 and 2. The branch flow path W62 shown in FIG. 7 is connected to the second outflow port 182 of the cooling gas-liquid separator 18 shown in FIGS. 1 and 2. The branch flow path W63 shown in FIG. 7 is connected to the second outflow port 142 of the heating gas-liquid separator 14. Therefore, the internal flow path W60 and the branch flow path W63 of the housing 40 forms at least a part of the flow path W13 shown in FIGS. 1 and 2. Further, the branch flow path W62 forms at least a part of the flow path W12 connecting from the second outflow port 182 of the cooling gas-liquid separator 18 to the junction P11. Furthermore, the branch flow path W61 forms at least a part of the flow path W13 connecting from the junction P11 to the compressor 11.

According to the attachment structure 30 for the expansion valves 13, 17, 22 of the present embodiment described above, the following functions and effects (1) to (6) can be obtained.

(1) Since the multiple expansion valves 13, 17, 22 are collectively arranged in the housing 40, an installation space for the expansion valves 13, 17, 22 can be reduced as compared with a case where the expansion valves 13, 17, 22 are scattered. Further, since the flow paths W20, W30, W40, W50 that are opened and closed by the expansion valves 13, 17, 22 are also arranged inside the housing 40, flow paths connecting the expansion valves 13, 17, 22 and other components of the heat pump cycle 10 can be shortened. Therefore, space can be saved at the time of attachment of the expansion valves 13, 17, 22.

(2) The multiple expansion valves 13, 17, 22 are aligned in the housing 40. The multiple expansion valves 13, 17, 22 are arranged in line on the housing 40. Thus, as shown in FIG. 3, when a direction in which the expansion valves 13, 17, 22 are arranged is defined as an X direction, a size of the housing 40 in a Y direction perpendicular to the X direction can be reduced. That is, increase in size of the housing 40 in the Y direction can be avoided.

(3) As shown in FIG. 1, when the heat pump cycle 10 operates in a circuit corresponding to the cooling operation of the air conditioner, the heat mediums flowing through the cooling expansion valve 17 and the battery cooling expansion valve 22 are lower in temperature than the heat medium flowing through the heating expansion valve 13. Therefore, the heating expansion valve 13 serves as a high-temperature expansion valve through which a first temperature heat medium flows, and the cooling expansion valve 17 and the battery cooling expansion valve 22 serve as a low-temperature expansion valve through which a second temperature heat medium flows. The first temperature is higher than the second temperature. In this case, if the heating expansion valve 13 is arranged between the cooling expansion valve 17 and the battery cooling expansion valve 22 in the housing 40, the heat mediums flowing through the cooling expansion valve 17 and the battery cooling expansion valve 22 may perform heat exchange with the heat medium flowing through the heating expansion valve 13. And thereby, a heat exchange efficiency in the heat pump cycle 10 may be deteriorated. Regarding this, in the housing 40 of the present embodiment, the cooling expansion valve 17 and the battery cooling expansion valve 22 are arranged together. In other words, the cooling expansion valve 17 and the battery cooling expansion valve 22 are arranged next to each other without the heating expansion valve 13 being interposed therebetween. According to this configuration, as compared with a case where the heating expansion valve 13 is arranged between the cooling expansion valve 17 and the battery cooling expansion valve 22 in the housing 40, the heat mediums flowing through the cooling expansion valve 17 and the battery cooling expansion valve 22 are less likely to perform heat exchange with the heat medium flowing through the heating expansion valve 13. Deterioration in heat exchange efficiency of the heat pump cycle 10 can be reduced. In the present embodiment, the heating expansion valve 13 corresponds to a third expansion valve, the cooling expansion valve 17 corresponds to a first expansion valve, and the battery cooling expansion valve 22 corresponds to a second expansion valve.

(4) The multiple expansion valves 13, 17, 22 are attached to the housing 40 by mating the retaining plate 70 to the housing 40. According to this configuration, man-hours for assembly can be reduced as compared with a case where the expansion valves 13, 17, 22 are individually assembled to the housing 40 without the retaining plate 70. Also, the cost for assembly can be reduced.

(5) The expansion valve 13 has the valve element 81 and the valve seat 82. According to this configuration, it is only necessary to provide the insertion hole 43 into which the expansion valve 13 is inserted on the housing 40, so that the structure of the housing 40 can be simplified.

(6) The housing 40 has the insertion holes 41, 42, 43 into which the expansion valves 13, 17, 22 are respectively inserted. The insertion holes 41, 42, 43 have the lower portions 411, 421, 431 and the upper portions 412, 422, 432 while the upper portions 412, 422, 432 are different in inner diameter from the lower portions 411, 421, 431. The O-ring 83 seals the gap between the small diameter portion 800 and the outer peripheral surface of the expansion valve 13, 17, 22. The O-ring 84 seals the gap between the large diameter portion 801 and the outer peripheral surface of the expansion valve 13, 17, 22. According to this configuration, leakage of the heat medium inside the housing 40, so-called internal leakage, can be reduced. In the present embodiment, the lower portions 411, 421, 431 and the upper portions 412, 422, 432 of the insertion holes 41, 42, 43 correspond to insertion portions having different inner diameters.

Second Embodiment

Next, an attachment structure 30 for expansion valves 13, 17, 22 according to a second embodiment will be described. Hereinafter, differences from the attachment structure 30 of the first embodiment will be mainly described.

Figure 10:
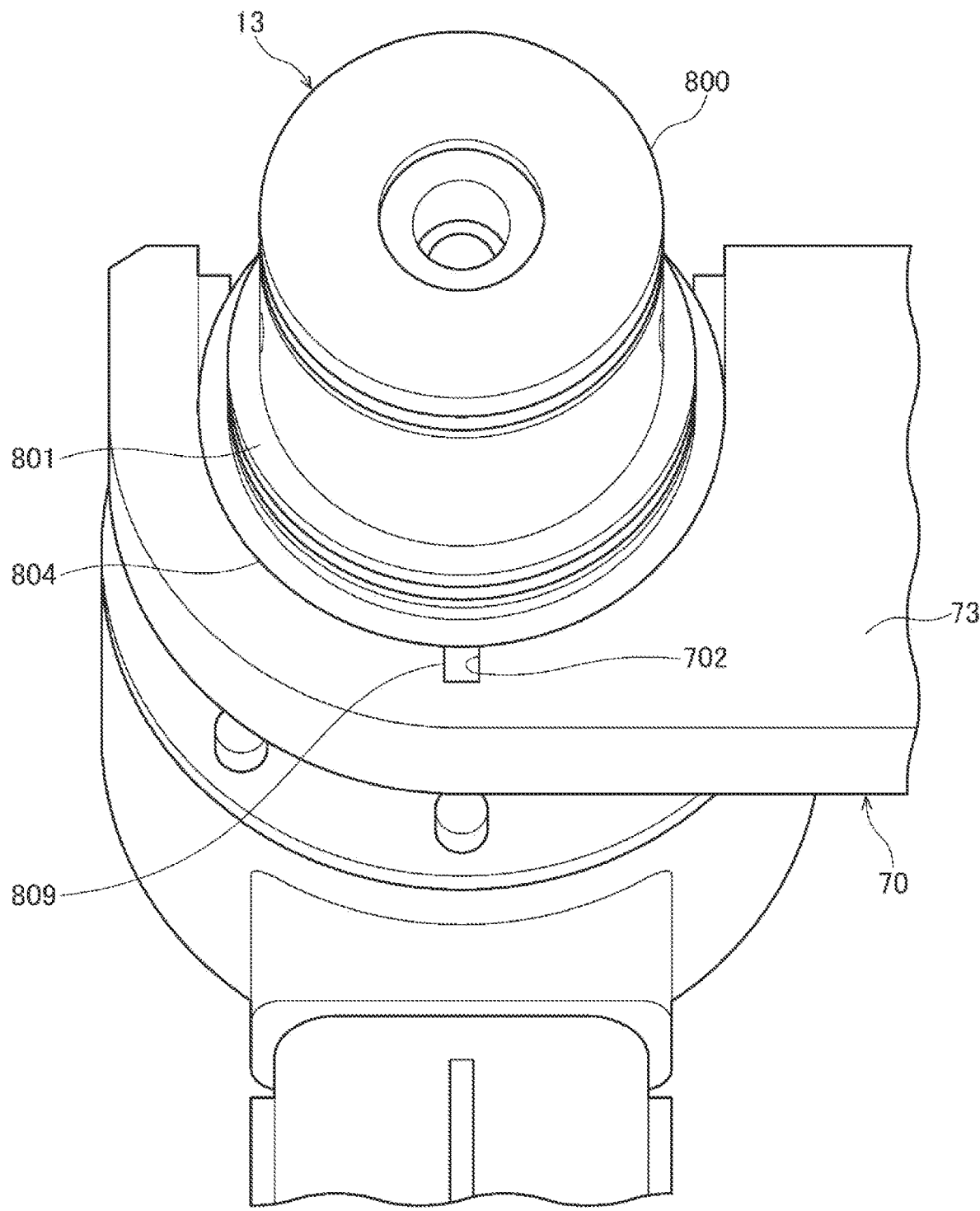
FIG. 10 is a bottom view showing an expansion valve and a retaining plate according to a second embodiment.

As shown in FIG. 10, a protrusion 809 is formed on an outer peripheral surface of an expansion valve 13 of the present embodiment. A bottom surface 73 of a retaining plate 70 has a fitting hole 702 into which the protrusion 809 of the expansion valve 13 is fitted.

According to the attachment structure 30 of the present embodiment described above, the following functions and effects (7) can be further obtained.

(7) Since the protrusion 809 of the expansion valve 13 and the fitting hole 702 of the retaining plate 70 are fitted to each other, the position of the expansion valve 13 relative to the retaining plate 70 in a circumferential direction of the expansion valve 13 can be fixed. Thus, in the attachment structure 30 of the present embodiment, the fitting hole 702 of the retaining plate 70 corresponds to a positioner that positions the expansion valve 13 relative to the retaining plate 70. The positioner may be configured to fix the position of the expansion valve 13 relative to the retaining plate 70. This configuration facilitates positioning of the expansion valve 13 relative to the retaining plate 70.

Third Embodiment

Next, an attachment structure 30 for expansion valves 13, 17, 22 according to a third embodiment will be described. Hereinafter, differences from the attachment structure 30 of the first embodiment will be mainly described.

Figure 11:
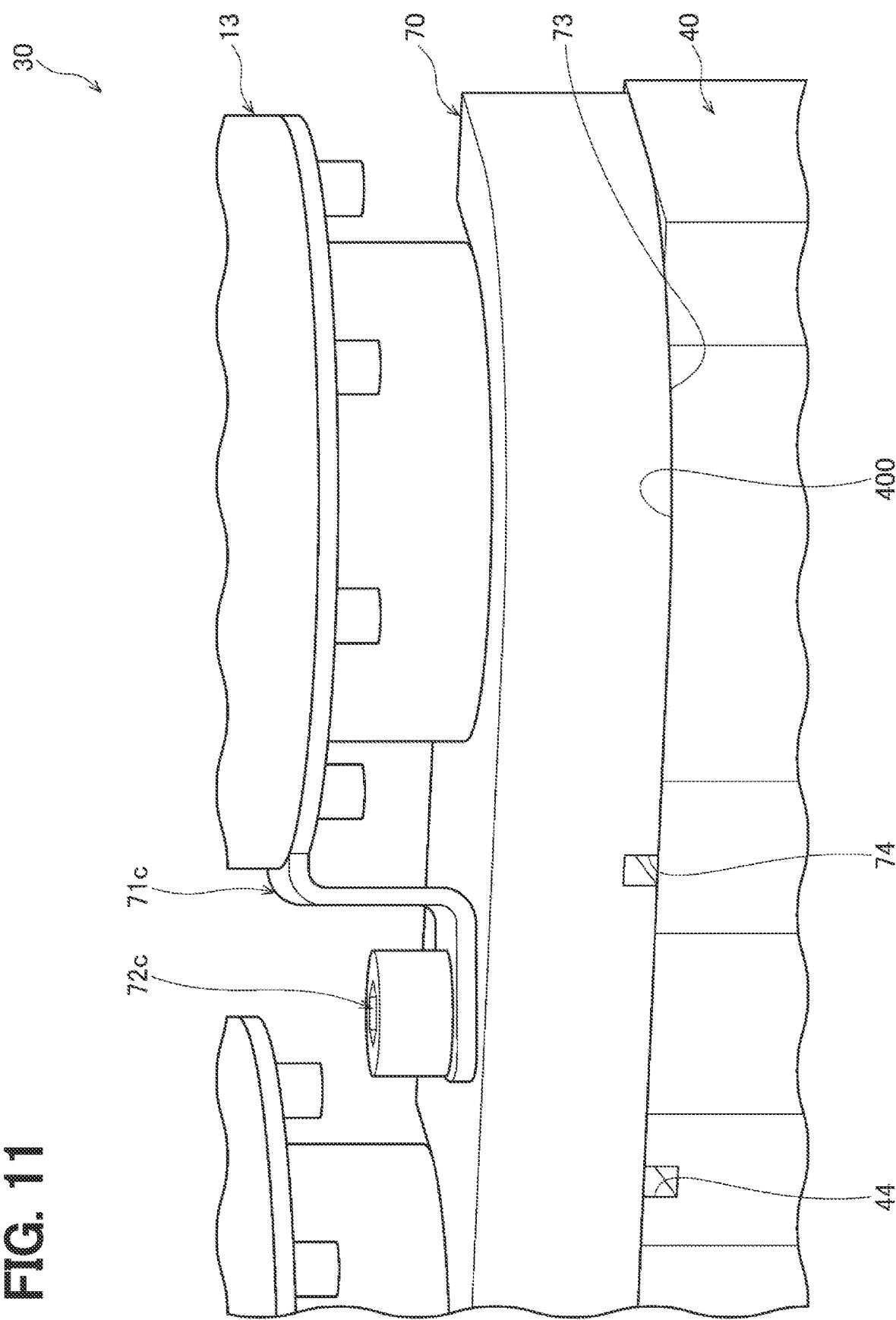
FIG. 11 is a perspective view showing a housing around expansion valves and a retaining plate, according to a third embodiment.

As shown in FIG. 11, a bottom surface 73 of a retaining plate 70 of the present embodiment has a recessed drain groove 74. Similarly, an upper surface 400 of a housing 40 also has a recessed drain groove 44. In the present embodiment, the bottom surface 73 of the retaining plate 70 corresponds to a contact surface of the retaining plate 70 that contacts the housing 40. Further, the upper surface 400 of the housing 40 corresponds to a contact surface of the housing 40 that contacts the retaining plate 70.

According to the attachment structure 30 of the present embodiment described above, the following functions and effects (8) can be further obtained.

(8) If water accumulates between the upper surface 400 of the housing 40 and the bottom surface 73 of the retaining plate 70, the water may remain therebetween without being discharged. In this case, the water may corrode the housing 40 and the retaining plate 70. In this regard, in the attachment structure 30 of the present embodiment, even if water accumulates between the upper surface 400 of the housing 40 and the bottom surface 73 of the retaining plate 70, the water can be discharged to the outside through the drain grooves 44 and 74. Therefore, corrosion of the housing 40 and the retaining plate 70 due to stagnant water can be suppressed.

Fourth Embodiment

Next, an attachment structure 30 for expansion valves 13, 17, 22 according to a fourth embodiment will be described. Hereinafter, differences from the attachment structure 30 of the first embodiment will be mainly described.

Figure 12:
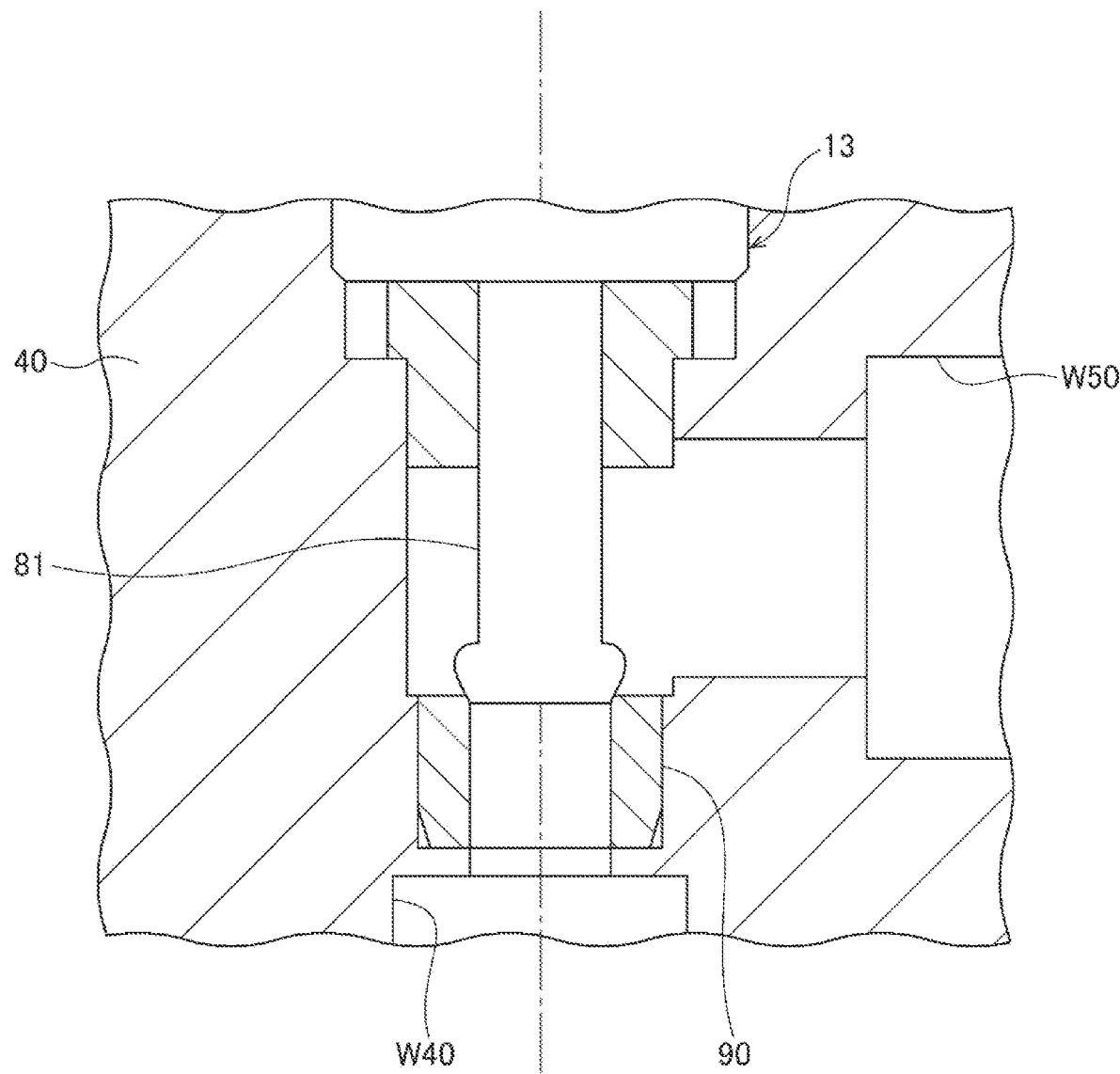
FIG. 12 is a cross-sectional diagram illustrating a housing around an expansion valve according to a fourth embodiment.

As shown in FIG. 12, the housing 40 of the present embodiment has a valve seat 90 inside the housing 40. The expansion valve 13 has a valve element 81 that is seated on and separated from the valve seat 90.

According to the attachment structure 30 of the present embodiment described above, the following functions and effects (9) can be further obtained.

(9) Since the expansion valve 13 does not need to be provided with a valve seat, the structure of the expansion valve 13 can be simplified.

Fifth Embodiment

Next, an attachment structure 30 for expansion valves 13, 17, 22 according to a fifth embodiment will be described. Hereinafter, differences from the attachment structure 30 of the first embodiment will be mainly described.

Figure 13:
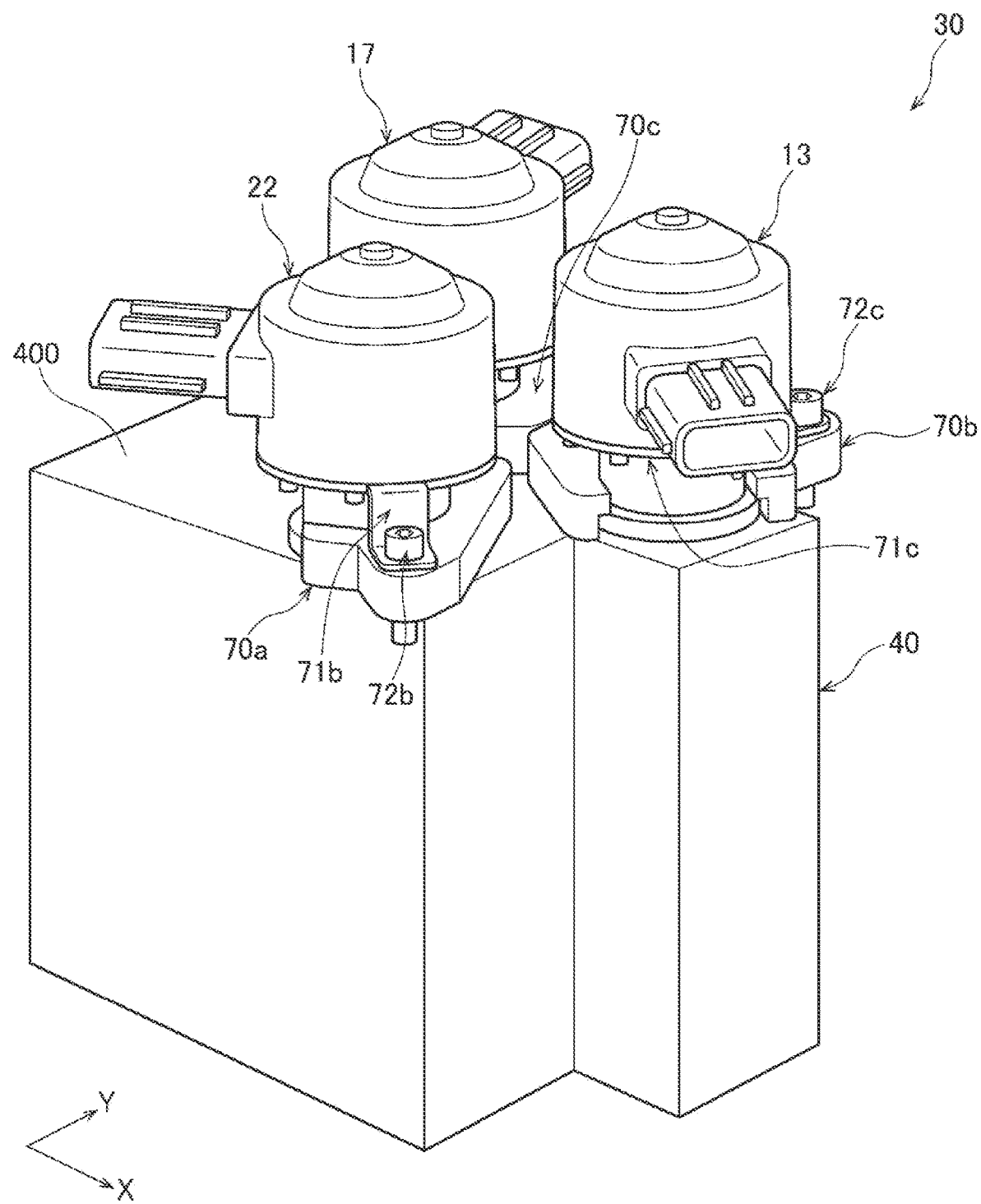
FIG. 13 is a perspective view showing expansion valves and a housing according to a fifth embodiment.

As shown in FIG. 13, in the attachment structure 30 of the present embodiment, the expansion valves 13, 17, 22 are provided on an upper surface 400 of a housing 40. In FIG. 13, two orthogonal axial directions on the upper surface 400 of the housing 40 are indicated by the X direction and the Y direction. In the present embodiment, the X direction corresponds to a first axial direction, and the Y direction corresponds to a second axial direction. The expansion valves 13, 17, 22 are arranged on the upper surface 400 of the housing 40 so as to be offset from each other in the X direction and the Y direction.

According to the attachment structure 30 of the present embodiment described above, the following functions and effects (10) can be further obtained.

(10) In the attachment structure 30 of the present embodiment, multiple flow paths formed inside the housing 40 can be arranged more three-dimensionally than a structure in which the expansion valves 13, 17, 22 are aligned on the upper surface 400 of the housing 40 like the attachment structure 30 of the first embodiment. As a result, a degree of freedom in designing the internal flow paths inside the housing 40 can be improved, for example, the lengths of the flow paths formed inside the housing 40 can be minimized.

Sixth Embodiment

Next, an attachment structure 30 for expansion valves 13, 17, 22 according to a sixth embodiment will be described. Hereinafter, differences from the attachment structure 30 of the first embodiment will be mainly described.

Figure 14:
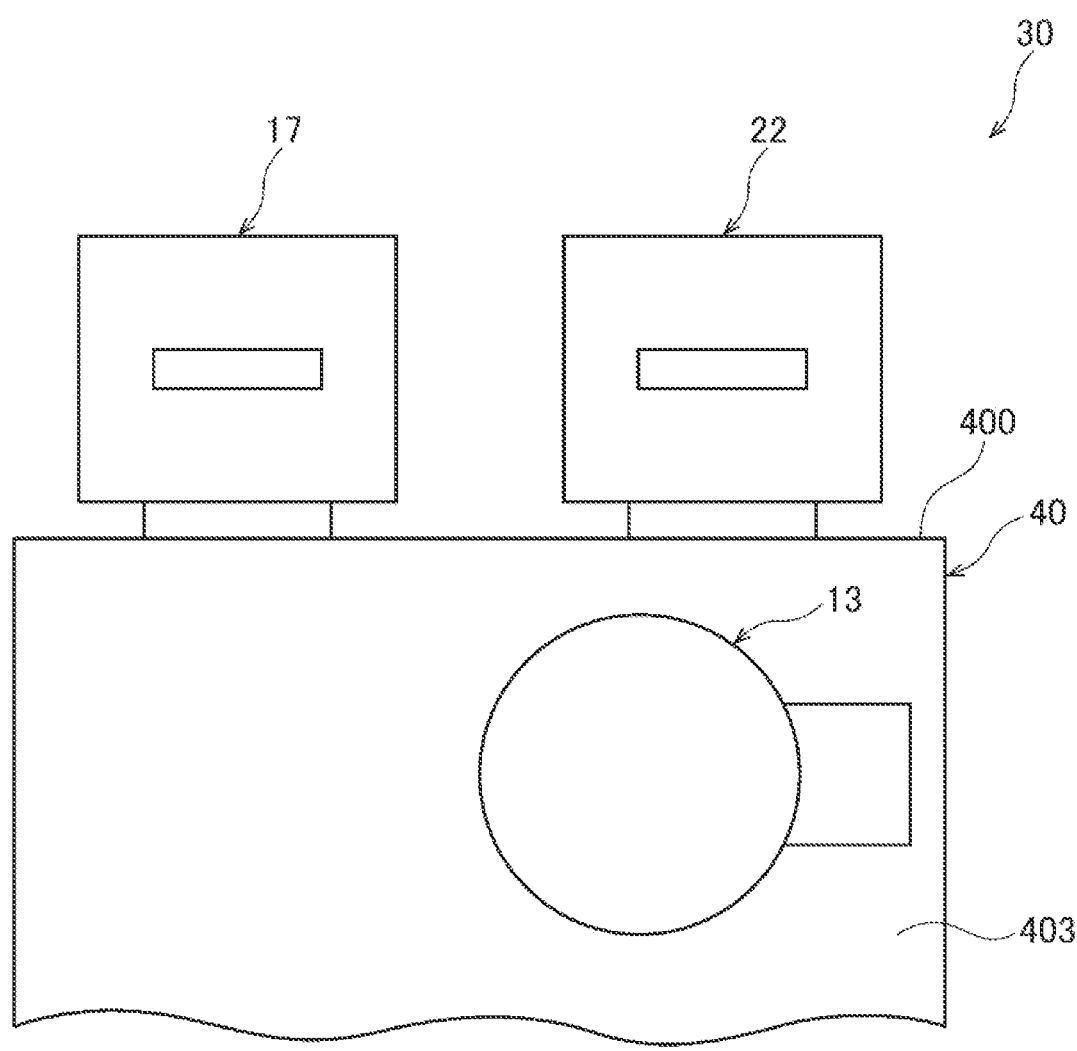
FIG. 14 is a front view showing expansion valves and a housing according to a sixth embodiment.

As shown in FIG. 14, in the attachment structure 30 of the present embodiment, expansion valves 17 and 22 are provided on the upper surface 400 of the housing 40, and an expansion valve 13 is provided on a lateral surface 403 of the housing 40.

According to the attachment structure 30 of the present embodiment described above, the following functions and effects (11) can be further obtained.

(11) In the attachment structure 30 of the present embodiment, as in the attachment structure 30 of the fifth embodiment, multiple flow paths formed inside the housing 40 can be arranged more three-dimensionally, and thus a degree of freedom in designing the internal flow paths of the housing 40 can be increased.

Other Embodiments

The preceding embodiments may be practiced in the following embodiments.

The number of expansion valves provided in the housing 40 can be arbitrarily changed.

When cooling of the battery is required due to increase in temperature of the battery in a vehicle in which the housing 40 of each embodiment is mounted, the air conditioner may perform the cooling of the battery not only in the cooling operation of the air conditioner but also in the heating operation of the air conditioner. For example, the vehicle may separately include a heat pump cycle and a battery cooling circuit. The heat pump cycle operates depending on whether the air conditioner is performing the cooling operation or the heating operation, and the battery cooling circuit independently cools the battery. In this case, the battery can be cooled by activating the battery cooling circuit regardless of whether the air conditioner is performing the cooling operation or the heating operation. Therefore, the battery cooling expansion valve 22 shown in FIG. 3 is provided in the battery cooling circuit and used to generate a low-pressure heat medium in the circuit. A method for cooling the battery may be the method of using the cooling water circulator 23 as shown in FIGS. 1 and 2, or may be a method of cooling the battery by direct heat exchange between the battery and low-pressure heat medium generated by the battery cooling expansion valve 22.

The housing 40 of each embodiment includes a single expansion valve 13 corresponding to the high-temperature expansion valve, and two expansion valves 17 and 22 corresponding to the low-temperature expansion valve. However, for example, the housing 40 may include multiple expansion valves corresponding to the high-temperature expansion valve and a single expansion valve corresponding to the low-temperature side expansion valve. In this case, when the multiple high-temperature expansion valves are collectively arranged in the housing 40, the functions and effects similar to the above (3) can be obtained.

The attachment structure 30 of each embodiment can be used not only in the heat pump cycle 10 shown in FIGS. 1 and 2 but also in any heat pump cycle.

The present disclosure is not limited to the above specific examples. Those skilled in the art may appropriately modify the above described specific examples, and these modifications are also included in the scope of the present disclosure as long as they have the features of the present disclosure. The respective elements included in the respective specific examples described above, and their arrangements, conditions, shapes, and the like can be appropriately changed without being limited to those described as examples. The elements included in each of the specific examples described above can be appropriately combined as long as there is no technical contradiction.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

The invention claimed is:

1. An attachment structure for expansion valves, comprising:

the expansion valves used in a vehicle; and a single housing to which the expansion valves are attached, wherein the single housing includes a flow path through which heat medium circulating in a heat pump cycle of an air conditioner of the vehicle flows, the flow path is opened and closed by the expansion valves, the expansion valves are aligned, the flow path includes an internal flow path through which two of the expansion valves communicate with each other, and a branch flow path through which the heat medium flows into the internal flow path from an outside of the single housing, and the expansion valves include a first expansion valve configured to open and close one end of the internal flow path, and a second expansion valve configured to open and close another end of the internal flow path.

2. The attachment structure according to claim 1, wherein the single housing further includes a flow path through which two different gas-liquid separators are connected.

3. The attachment structure according to claim 1, wherein the first expansion valve and the second expansion valve are collectively attached to the single housing.

4. The attachment structure according to claim 3, wherein the first expansion valve is used in the heat pump cycle when the air conditioner performs a cooling operation, the second expansion valve is used in a circuit for cooling a battery of the vehicle, the expansion valves further include a third expansion valve used in the heat pump cycle when the air conditioner performs a heating operation.

5. The attachment structure according to claim 1, further comprising:

a retaining plate to which the expansion valves are fixed, wherein the expansion valves are attached to the single housing via attachment of the retaining plate to the single housing.

6. The attachment structure according to claim 5, wherein the retaining plate has a positioner that positions the expansion valves relative to the retaining plate.

7. The attachment structure according to claim 5, wherein at least one of a contact surface of the retaining plate that is in contact with the single housing or a contact surface of the single housing that is in contact with the retaining plate has a drain groove that discharges fluid that has entered a gap between the contact surfaces of the retaining plate and the single housing.

8. The attachment structure according to claim 1, wherein the expansion valves each include a valve element and a valve seat which the valve element is seated on and separated from.

9. The attachment structure according to claim 1, wherein the expansion valves each include a valve element, and the single housing includes a valve seat which the valve element is seated on and separated from.

10. The attachment structure according to claim 1, wherein the single housing has insertion holes into which the expansion valves are respectively inserted, the insertion holes each have insertion portions having different inner diameters, and each insertion portion is provided with a sealing member that seals a gap between the insertion portion and an outer peripheral surface of an expansion valve.

11. An attachment structure for expansion valves, comprising:

the expansion valves used in a vehicle; and a housing to which the expansion valves are attached, wherein the housing includes a flow path through which heat medium circulating in a heat pump cycle of an air conditioner of the vehicle flows, the flow path is opened and closed by the expansion valves, the expansion valves are aligned, the flow path includes an internal flow path through which two of the expansion valves communicate with each other, and a branch flow path through which the heat medium flows into the internal flow path from an outside of the housing, the expansion valves include a first expansion valve configured to open and close one end of the internal flow path, and a second expansion valve configured to open and close another end of the internal flow path, and the housing further includes a flow path through which two different gas-liquid separators are connected.

12. An attachment structure for expansion valves, comprising:

the expansion valves used in a vehicle; and a housing to which the expansion valves are attached, wherein the housing includes a flow path through which heat medium circulating in a heat pump cycle of an air conditioner of the vehicle flows, the flow path is opened and closed by the expansion valves, the expansion valves are aligned, the flow path includes an internal flow path through which two of the expansion valves communicate with each other, and a branch flow path through which the heat medium flows into the internal flow path from an outside of the housing, the expansion valves include a first expansion valve configured to open and close one end of the internal flow path, and a second expansion valve configured to open and close another end of the internal flow path, the expansion valves each include a valve element, and the housing includes a valve seat which the valve element is seated on and separated from.

* * * * *